United States Patent [19]

Hao et al.

[11] Patent Number: 5,742,778
[45] Date of Patent: Apr. 21, 1998

[54] METHOD AND APPARATUS TO SENSE AND MULTICAST WINDOW EVENTS TO A PLURALITY OF EXISTING APPLICATIONS FOR CONCURRENT EXECUTION

[75] Inventors: Ming C. Hao, Los Altos Hills; Alan H. Karp, Sunnyvale; Vineet Singh, Mountain View, all of Calif.

[73] Assignee: Hewlett-Packard Company, Palo Alto, Calif.

[21] Appl. No.: 602,386

[22] Filed: Feb. 16, 1996

Related U.S. Application Data

[63] Continuation of Ser. No. 113,790, Aug. 30, 1993, abandoned.

[51] Int. Cl.⁶ .................................................. G06F 3/14
[52] U.S. Cl. ........................................ 395/332; 395/346
[58] Field of Search ............................. 395/155, 161, 395/157, 158, 159, 156, 160, 153, 650, 331, 332, 329, 330, 335, 339, 346, 340, 348, 680, 971; 345/119, 120, 145, 146

[56] References Cited

U.S. PATENT DOCUMENTS

| | | | |
|---|---|---|---|
| 4,761,642 | 8/1988 | Huntzinger ............... | 345/120 |
| 4,896,290 | 1/1990 | Rhodes et al. ............ | 395/887 |
| 4,975,690 | 12/1990 | Torres ..................... | 345/119 |
| 5,046,001 | 9/1991 | Barker et al. ............ | 345/120 X |
| 5,050,105 | 9/1991 | Peters ..................... | 345/119 |
| 5,226,117 | 7/1993 | Miklos .................... | 395/346 X |
| 5,353,398 | 10/1994 | Kitahara et al. .......... | 395/332 |
| 5,379,374 | 1/1995 | Ishizaki et al. ........... | 395/331 |
| 5,392,400 | 2/1995 | Berkowitz et al. ........ | 395/332 X |
| 5,491,795 | 2/1996 | Beaudet et al. .......... | 395/346 |

FOREIGN PATENT DOCUMENTS

| | | |
|---|---|---|
| 0368779 A2 | 5/1990 | European Pat. Off. . |
| 0408391 A2 | 1/1991 | European Pat. Off. . |
| 0458715 A2 | 11/1991 | European Pat. Off. . |
| 0 475 581 A2 | 3/1992 | European Pat. Off. .......... G06F 9/46 |
| 0475581 A2 | 3/1992 | European Pat. Off. . |
| 0 489 576 A2 | 6/1992 | European Pat. Off. ........ G06F 3/023 |
| 0 527 590 A2 | 2/1993 | European Pat. Off. . |
| 0534409 A2 | 3/1993 | European Pat. Off. . |
| 2 272 311 A | 5/1994 | United Kingdom . |

OTHER PUBLICATIONS

Munsch, Pamela W., et al., "HP IVI Application Prograram Interface Design", Hewlett–Packard Journal, Oct. 1990, pp. 21–31.

*Primary Examiner*—Raymond J. Bayerl
*Assistant Examiner*—Crescelle N. dela Torre

[57] ABSTRACT

A multicasting system for multicasting window events to various application programs running on a computer system, each such program having an application window. A global control program runs on the computer system and has a global control window. Through the global control program, a user selects one or more of the application programs to receive incoming window events. Later, when the global control window is active, any incoming window event is received in that window. The global control program automatically multicasts each such event to every application program that the user has selected to receive incoming window events. Events may be multicast directly to child windows of the various application windows. The global control window may have a global child window that receives incoming window events; such events are multicast directly to selected child windows of the application programs. The application programs may be resident locally or on a remote computer system. If window events are received out of sequence, the global control program may either ignore them or resequence them for proper operation.

21 Claims, 8 Drawing Sheets

METHOD AND APPARATUS TO SENSE AND MULTICAST WINDOW EVENTS TO A PLURALITY OF EXISTING APPLICATIONS FOR CONCURRENT EXECUTION

CROSS REFERENCE TO RELATED APPLICATION

This is a continuation of application Ser. No. 08/113,790 filed on Aug. 30, 1993, now abandoned.

BACKGROUND OF THE INVENTION

1. Field of the Invention

The present invention relates to a graphical user interface and, more particularly, to a graphical user interface that enables window events to be multicast to graphical user interfaces of program applications.

2. Description of the Related Art

Although graphical user interfaces (GUIs) have improved over the years, they are still based on a single-threaded dialogue. In a single-threaded dialogue, a user operates on one single command button to invoke one application or to execute one single function at a time. FIGS. 1A, 1B and 2 illustrate examples of known windows computing environments.

FIGS. 1A and 1B illustrate examples of windows of a conventional windows environment as they typically appear on a screen display of a computer system. A windows manager 100 is a managing window for the windows environment. In FIG. 1A, the windows manager 100 includes application icons 102 to 112. Each of the icons 102 to 112 represents a different program which may be executed on the computer system. For example, application #1 can be invoked (started) by selecting App.1 icon 102. Once invoked, application #1 will typically place an application window (App.1) 114 on the screen display of the computer system (see FIG. 1B). The application window (App.1) 114 thereafter provides a means for inputting commands or data to application #1 or receiving computed results from application #1. Similarly, where application #2 and application #3 are invoked by selecting App.2 and App.3 icons 104 and 106, respectively, then application windows 116 and 118 are produced on the screen display of the computer system. FIG. 1B illustrates the windows manager 100 which may comprise application windows 114, 116 and 118 when applications #1, #2 and #3 are started.

FIG. 2 illustrates a conventional remote computing environment in which a host computer 200 is coupled to remote computers 202. Each remote computer 202 is able to run a sequential application 204. Each of the sequential applications 204 contained on the remote computers 202 produce an application window 206 on the host computer 200. The user typically resides at the host computer 200 and interacts with the sequential applications 204 via the application windows 206. The application windows 206 enable the user to input commands or data for the sequential applications 204 or to receive information back from the sequential applications 204. The commands or other information are passed back and forth to/from the remote sites from/to the host site using known communication protocols, such as UNIX Sockets. In a standard client-server model, the host computer 200 is the server, and the sequential applications 204 are the clients. The screen display of the host computer 200 can serve the clients on any system in a network. The remote clients are able to display their windows on the host screen display when the host computer 200 (server) gives them the access authority.

In any case, the above-described known techniques suffer from two major disadvantages. The first disadvantage is that conventionally the user must input commands or data to each application window because each application window is exclusively associated with one of the sequential applications. This repetitive input of commands or data is a serious burden on the user when each of the application windows is to receive the same commands or data. The second disadvantage is that the known techniques do not allow multiple existing applications to be controlled simultaneously so that they initiate operations nearly simultaneously, unless their source code is changed.

Although there have been partial solutions with regard to these disadvantages, none of the partial solutions provide a complete and flexible solution which is satisfactory to users. A known partial solution is described in European Patent Application 0368779 A2, published Sep. 26, 1989. This partial solution provides a global cursor for use in a windows environment. Once global cursors are positioned within several program windows, common data can be simultaneously input to a plurality of programs via their respective program windows. This partial solution has many deficiencies. One notable deficiency is that this partial solution requires interpretation of keyboard events which hinders the ability of the partial solution to adapt to other kinds of events. Another deficiency is that this partial solution only supports a single-threaded dialogue in which only a single type of operation can be invoked in the several program windows. Yet another deficiency is that this partial solution requires tracking of pointer motion to obtain the current position of the pointer, which results in excessive processing overhead.

Thus, there is an unresolved need for a flexible mechanism which is able to multicast a window event to multiple graphical user interfaces so that duplication of input commands or data is eliminated and the operation requested by the window event can be executed concurrently by one or more program applications.

SUMMARY OF THE INVENTION

The invention relates to a method and apparatus for multicasting window events to selected application windows for concurrent initiation of operations. The invention operates to sense user window events and then to control and distribute the user window events to graphical user interfaces of selected program applications for concurrent execution in a distributed or multitasking environment. The invention overcomes not only the repetitive entry problem of the prior art which required entry of commands or data for each application, but also the inability of prior art approaches to multicast window events to existing graphical user interfaces of program applications without interpretation. The invention is flexible enough to handle multicasting to different application programs, to dynamically control grouping, ordering or sequencing of window events, and to permit multicasting of the window events to nearly simultaneously invoke different action types or operations in same or different GUI layers.

A first embodiment of the invention relates to a graphical user interface. The graphical user interface includes at least one application window for each of a plurality of application programs which are running, a concurrency control window for receiving window events to be multicast to more than one of said application windows for the application programs, and an event sense and distribution procedure for forwarding the window events received by the concurrency control window to a set of the application windows for substantially concurrent processing.

A second embodiment of the invention relates to a multi-layer graphical user interface for a windows computing environment. The multi-layer graphical user interface includes at least first and second levels. The first level includes a plurality of program windows, and each program window corresponds to a program application. The second level includes a control window which corresponds to a plurality of the program windows, wherein window events entered at the control window can be multicasted to more than one of said program windows in said first level.

A third embodiment of the invention relates to a method for concurrent execution of window events by one or more running application programs. Each running application program has at least one application window. The method includes the following steps: receiving an incoming window event, multicasting the window event to at least two of the application windows for the one or more running application programs, and simultaneously initiating execution of the window event multicasted in the one or more running application programs.

Additional advantages of the invention are that access to existing GUIs can be achieved at run time without any changes to the source code of either the program applications or their GUIs. Another advantage of the invention is that no recompilation, relinking or special libraries are required.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 3–8. However, those skilled in the art will readily appreciate that the detailed description given herein with respect to these figures is for explanatory purposes as the invention extends beyond these limited embodiments.

The invention concerns a mechanism to coordinate a plurality of operations such that they interact concurrently with an end user through event sensing and multicasting. The mechanism senses user generated events and multicasts these events to a selected set of application windows to execute operations concurrently. In accordance with the invention, an existing sequential application can be made distributed with no modification to the existing system or application software. The term distributed as used herein is broadly defined as including both a distributed computing environment and a multitasking environment. Distributed computing classically refers to separate programs being executed on different computers or workstations, while multitasking refers to separate programs being executed on the same computer or workstation.

Any application program running under a graphical user interface (GUI) that captures user events such as button press/release, key press/release or pointer movement can be run using the invention without change thereto. For example, the GUI could be the popular Windows, Macintosh, Motif or OpenLook interfaces.

Figure 1A:
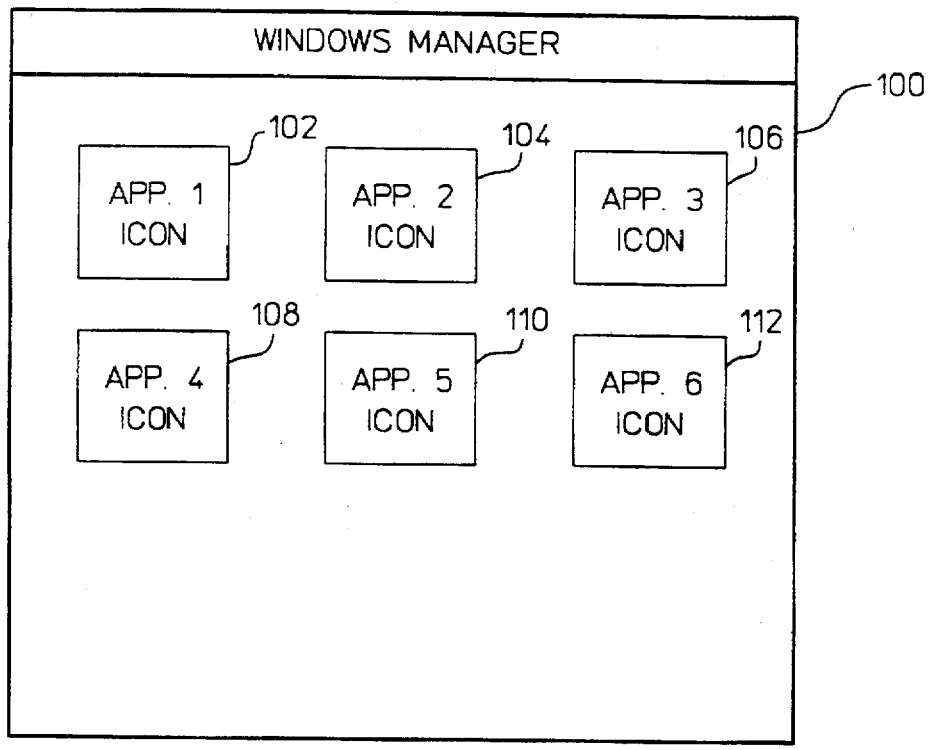
FIGS. 1A and 1B are diagrams of conventional windows of a conventional windows environment.
Figure 1B:
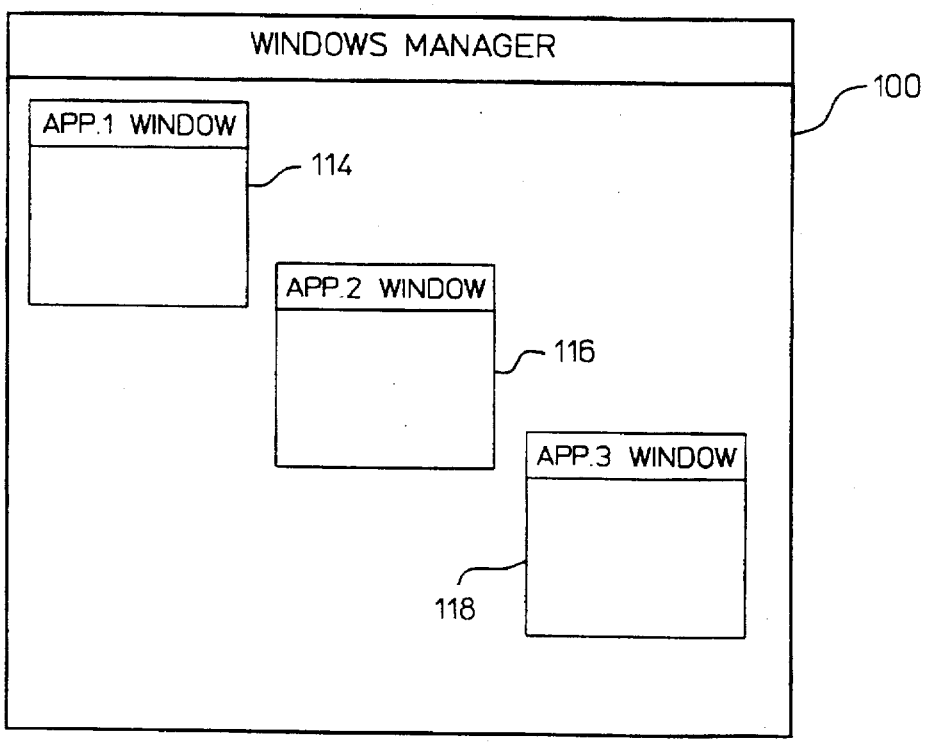
Figure 2:
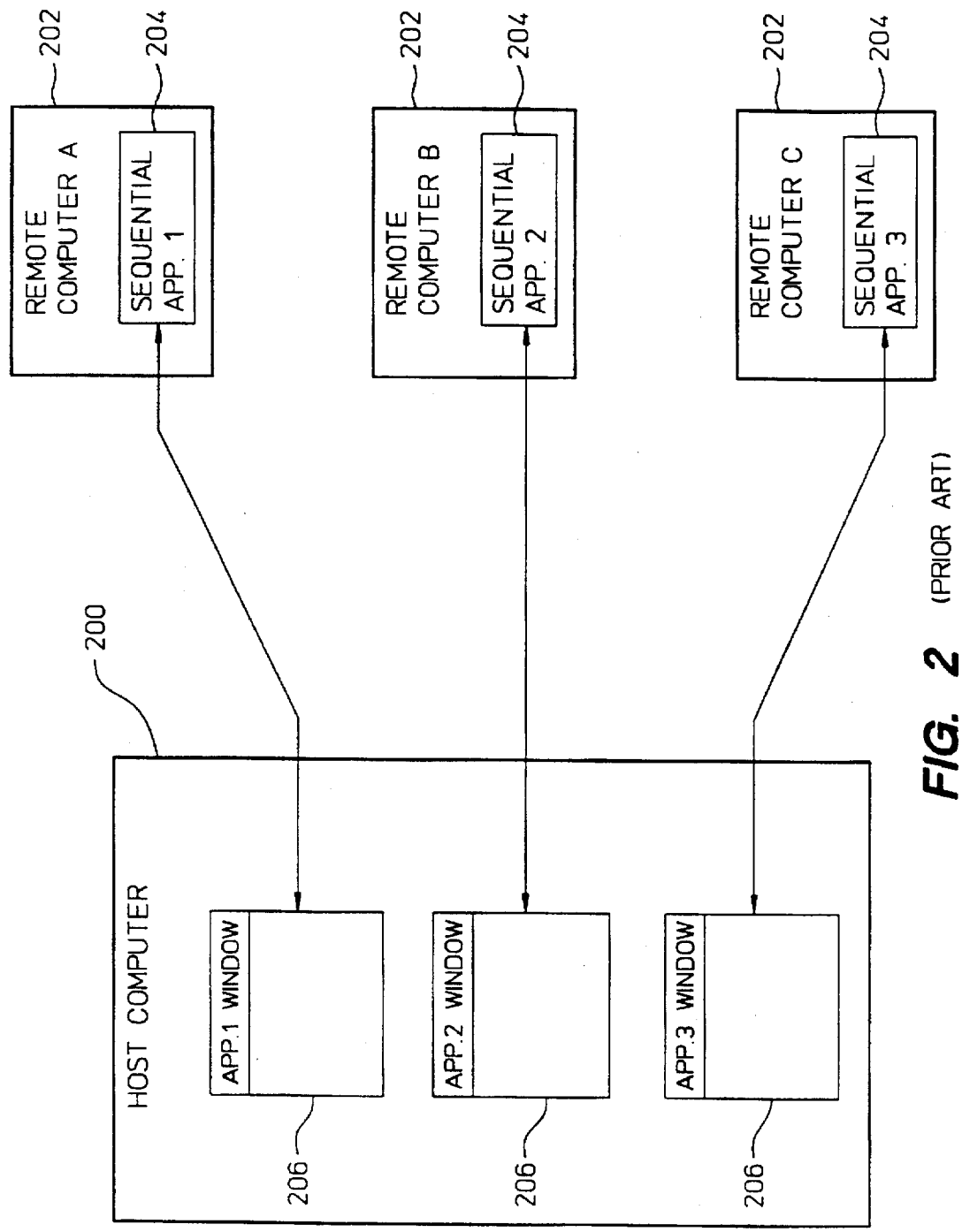
FIG. 2 is a block diagram of a conventional windows remote computing environment having a host computer and several remote computers.
Figure 3:
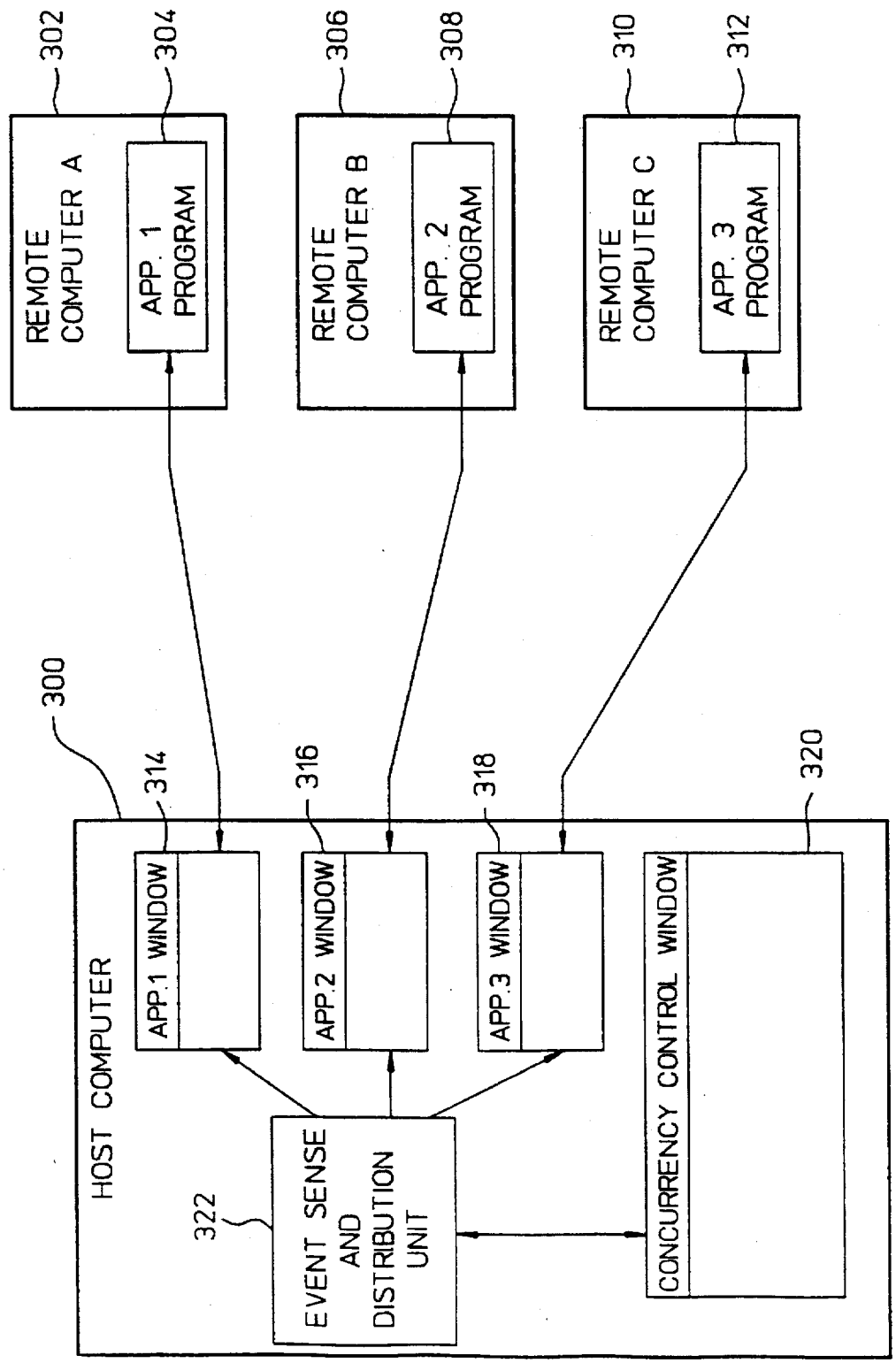
FIG. 3 is a block diagram of a basic embodiment of an event multicasting system according to the invention.

FIG. 3 is a block diagram of a basic embodiment of the event multicasting system of the invention in a remote computing environment. A host computer 300 is coupled to several remote computers which themselves execute programs. In particular, application #1 program 304 resides on remote computer A 302, application #2 program 308 resides on remote computer B 306, and application #3 312 resides on remote computer C 310. Normally, a user would start execution of application #1 304 while being physically located near an input device to the remote computer A 302. However, in this case the user, physically located near the host computer 300 and remote from the remote computers is able to begin execution of any or all of the application programs. Note, however, that the invention is applicable to the more simplified case of local computing (multitasking) where all application programs reside on the host computer. In any case, the application programs 304, 308 and 312 may be either sequential or distributed.

As shown in FIG. 3, the user may communicate with the application programs 304, 308 and 312 via application windows 314, 316 and 318 which appear on the screen display of the host computer 300. Each application window 314, 316 and 318 is capable of receiving window events for one of the application programs 304, 308 or 312 respectively associated therewith. For example, if the application #1 304 contained on the remote computer A 302 was a spreadsheet application program, then a user could type in commands for the spreadsheet via the application #1 window 314 present on the screen display of the host computer 300. The commands entered in the application #1 window 314 would then be sent using known communication protocols to the application program 304 (spreadsheet) on the remote computer 302 for processing.

The host computer 300 also includes a concurrency control window 320 and an event sense and distribution procedure 322. The concurrency control window 320 also appears on the screen display of the host computer 300. As shown in FIG. 3, the event sense and distribution procedure 322 is coupled to both the concurrency control window 320 and the application windows 314, 316 and 318. The event sense and distribution procedure 322 is a software processing unit, not a window.

The invention enables the user to enter window events (e.g., commands or other input) destined for one of the remote application programs via the concurrency control window 320, instead of the corresponding application windows 314, 316 or 318. When window events are entered into the concurrency control window 320, the event sense and distribution procedure 322 decides how the events requested by the user (using the concurrency control window 320) are distributed to the remote application programs via the application windows 314, 316 and 318. The concurrency control window 320 is a window as typically produced by windows system environments such as MS Windows or X Windows. See, e.g., Petzold, *Programming Windows*, Microsoft Press 1990; Nye, *Xlib Programming Manual for Version* 11, O'Reilly & Associates., Inc. 1992, which is hereby incorporated by reference.

Figure 4:
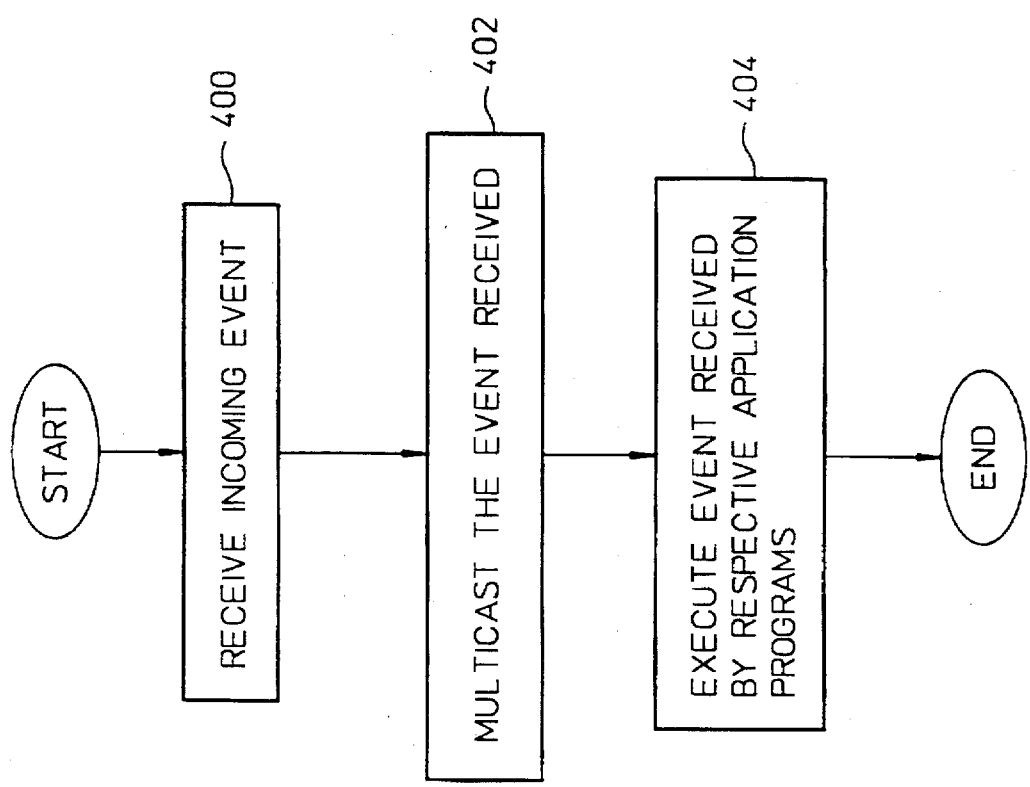
FIG. 4 is a flowchart illustrating basic processing procedures performed by the event multicasting system illustrated in FIG. 3.

FIG. 4 illustrates the basic processing steps performed by the event multicasting system illustrated in FIG. 3. Initially, the system receives 400 incoming events. In accordance with the basic embodiment shown in FIG. 3, the incoming events are sensed or received by the concurrency control window 320 because the user invokes the events in the concurrency control window 320. The events are standard window events, including keyboard events or button press/release events (e.g., mouse buttons). However, if desired, additional non-standard events can also be sensed or received by the concurrency control window 320 for future developed types of application windows. Normally, the incoming events are entered by a user. Next, the events received are multicasted 402. For example, if a window event is entered in the concurrency control window 320, the event sense and distribution procedure 322 may operate to multicast the event to one or more of the application windows 314, 316 and 318. Once the application windows 314, 316 and 318 receive the event, they pass the appropriate messages to their respective application program which executes 404 the event.

For example, with reference to FIG. 3, assume that the user enters an event into the concurrency control window 320 which is to be multicast to each of the application programs 304, 308 and 312. The event is then forwarded to the event sense and multicast procedure 322 which multicasts the event to each of the application windows 314, 316 and 318 which correspond to the program applications 304, 308 and 312. Once the event is received in the application windows 314, 316 and 318, the event is processed just as it would if the window event had been directly entered into the application windows.

The advantages of the invention with respect to this simplified example are that the user only had to enter the event once, yet it was multicast to three application programs. Conventionally, the user would have to enter the event once for each program, here three times. A second advantage to the invention is that the event entered is multicast to the program applications. As a result, execution of the event is initiated in the three program applications simultaneously. For a number of reasons (including the sequential nature of computers even when multitasking and the physical distances between different computers having the programs residing thereon), the execution of the events in the programs will not be precisely concurrent. However, the initiation of the execution will be nearly simultaneous or concurrent. Therefore, the events may be processed much more concurrently than possible with conventional sequential button pressing.

Although the above example multicast an event to all program applications, the event can also be multicast to a subset of the program applications or even to multiple input child windows of an application window for a single application. A user is also able to synchronize different types of window events. Moreover, as discussed above, the applications may reside either on a host computer or a remote computer.

Figure 5:
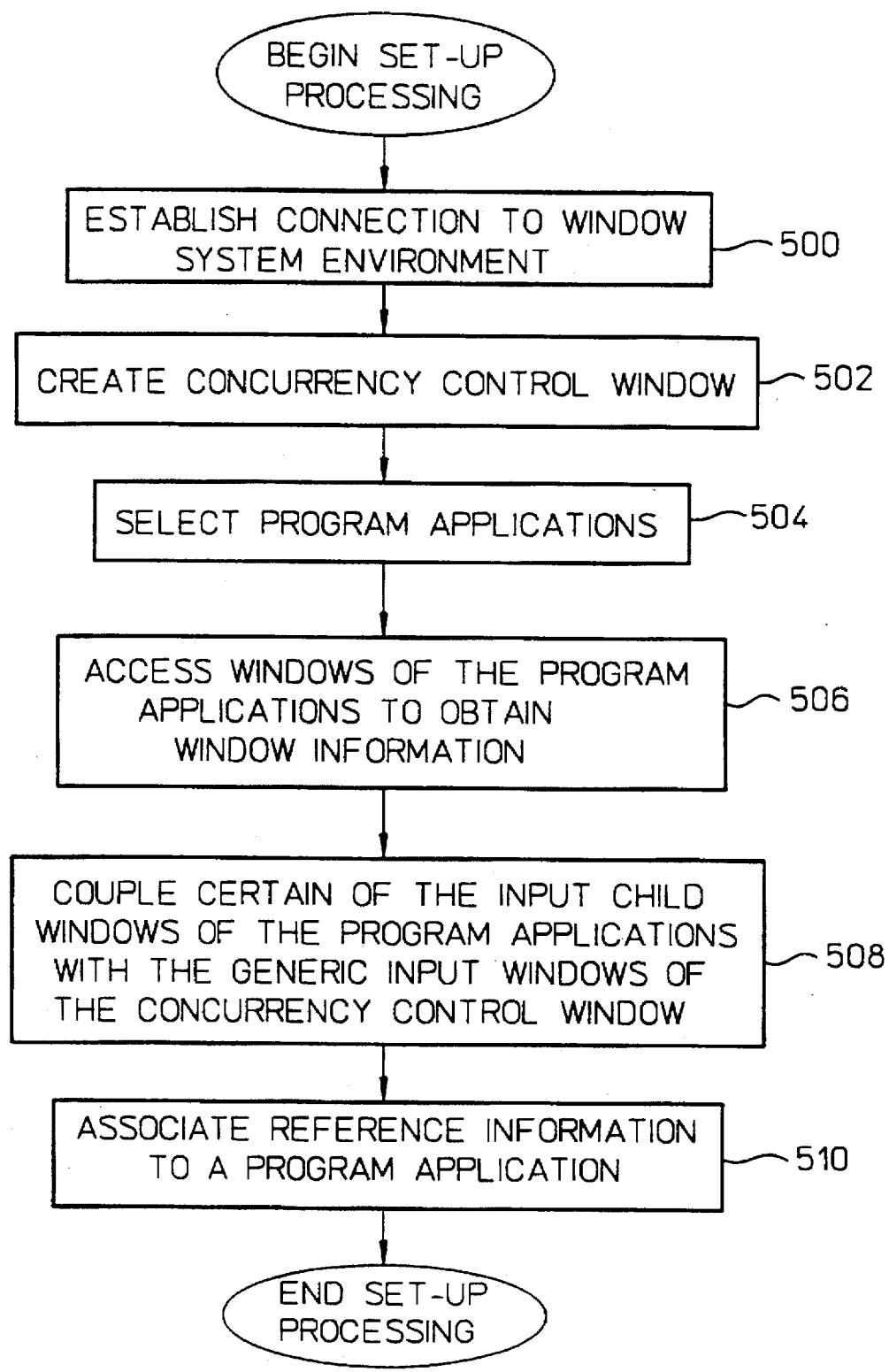
FIG. 5 is a flowchart illustrating set-up processing procedures.

In order to set up the event multicasting system so that it is ready to receive incoming events, set-up processing is required. FIG. 5 illustrates the set-up processing procedure according to an embodiment of the invention.

Figure 6:
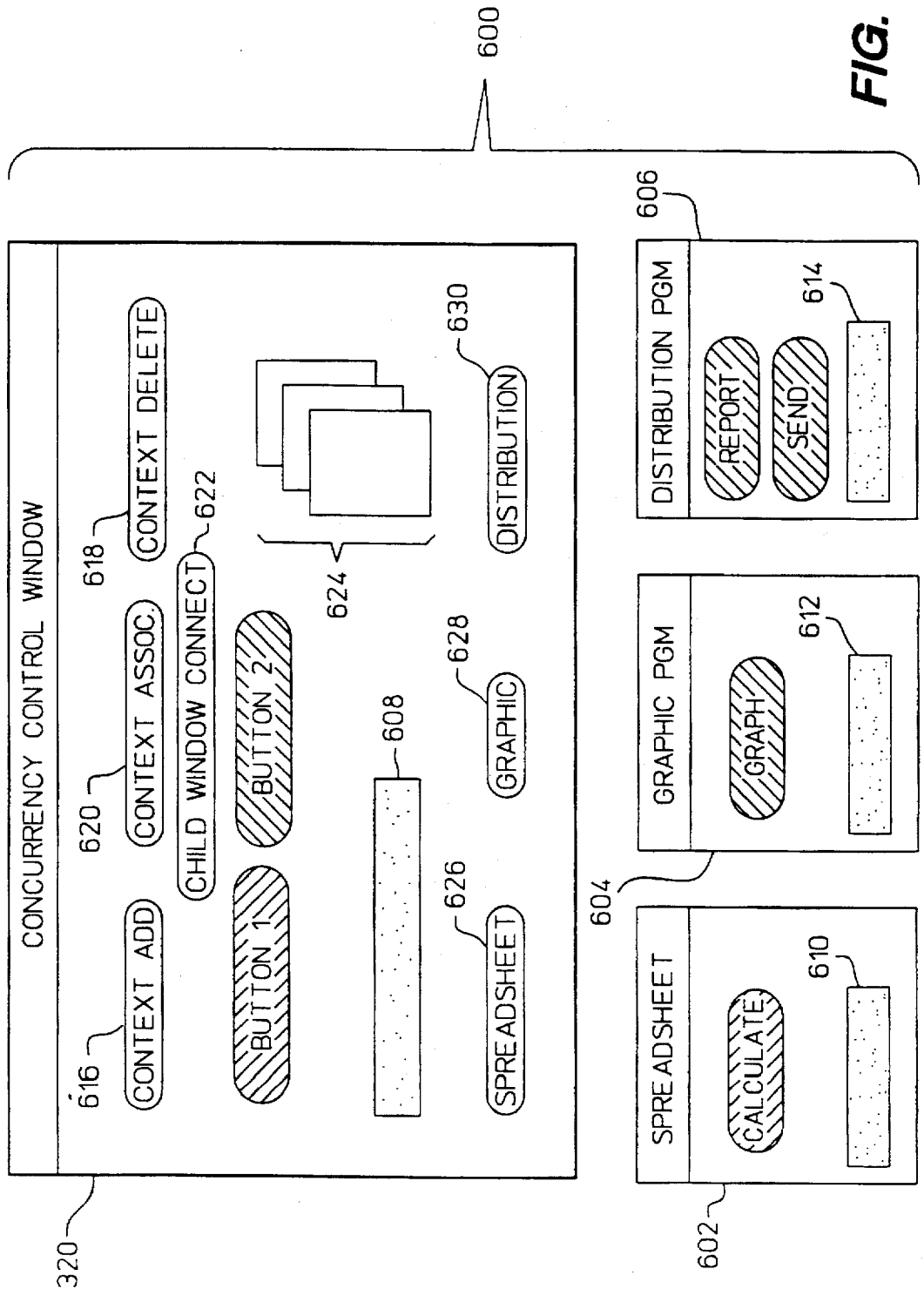
FIG. 6 is a diagram illustrating an example of a display screen of a computer system.

As shown in FIG. 5, the set-up processing begins by establishing connection to a window system environment 500. As discussed above, the invention operates with any windows-based GUIs. A concurrency control window 320 is then created 502 on the display screen of the host computer 300. FIG. 6, which is discussed in more detail below, illustrates an example of a concurrency control window 320.

Next, certain program applications which may be used are selected 504. This step can be performed in a number of different ways. For example, one may move a pointer to a context add button (discussed below with reference to FIG. 6) of the concurrency control window 320 then press a mouse button, then by moving the pointer to a program icon and again pressing the mouse button the program selection operation can be performed. The program applications, although shown as being remote in FIG. 3, may also be contained on the host computer 300 itself. In any case, an application window will appear on the display of the host computer 300 corresponding to the application program selected 504. The application window may, for example, be reduced to a smaller scale than the normal program window so that it does not cover-up the concurrency control window 320 (see FIG. 6).

The windows of the program applications which have been selected 504 and displayed are then accessed 506 to obtain their window information. In particular, the window applications of the program applications are accessed to determine their window characteristics, such as, child windows and their identifiers. A window query tree system call or pointer movement may be used to find such information. Typically, buttons and text fields are child windows of the application's main window, and these child windows are normally input windows which instruct the application what to do.

The concurrency control window 320 includes generic input windows (e.g., buttons, text fields and the like). Once the window characteristics of the windows of selected applications are obtained, the generic input windows are coupled 508 with one or more specific child windows in the same or different application windows of the application programs. Hence, users are able to dynamically couple the generic input windows of the concurrency control window 320 to any heterogeneous function or functions desired to be performed at run time. The coupling may be done either manually or automatically during set up.

A final, yet optional, step in the set-up processing is to associate 510 reference information to a program application. Certain application programs, when invoked, will produce reference windows of information used by the application program. For example, a spreadsheet program might have one reference window for a template and another window for data. By associating 510 this information to its appropriate program, a user can bring all the relevant windows to the foreground of the screen display with the click of a single button.

FIG. 6 is a diagram of an example of a display screen 600 in accordance with an embodiment of a spreadsheet example of the invention. The display screen 600 includes the concurrency control window 320 and windows 602, 604 and 606 for three application programs. The windows 602, 604 and 606 for the application programs represent a spreadsheet program, a graphic program and a distribution program, respectively.

FIG. 6 specifically illustrates how the generic input windows of the concurrency control window 320 might be coupled or connected to the input child windows of the various application programs. Namely, the Calculate Button of a spreadsheet program 602 is coupled to the generic input window in the concurrency control window 320 labeled Button 1. More importantly, the Graph Button of a graphic program and the Report and Send Buttons of a distribution program are coupled to the generic input window in the concurrency control window labeled as Button 2. That is, Button 2 is associated with the Graph Button of the graphic program and the Report and Send Buttons of the distribution program as indicated by the cross-hatching in FIG. 6. Thus, Button 2, when depressed, performs a multicasting operation. This completes the set-up processing.

Figure 7:
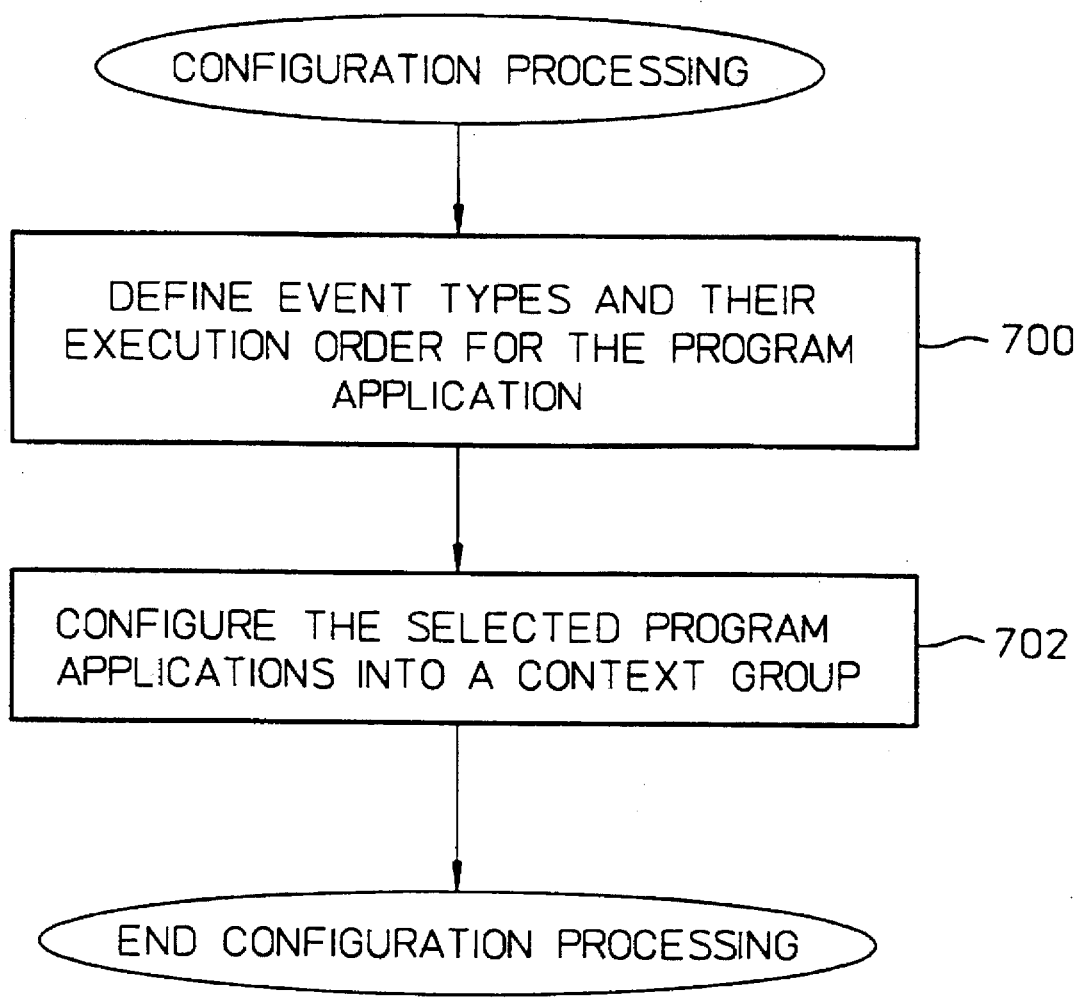
FIG. 7 is a flowchart illustrating configuration processing procedures.

Once the concurrency control window 320 has been set up, additional configuring may be carried out. FIG. 7 illustrates configuration processing which may be performed. In accordance with the program applications, the event types (e.g., keyboard events, mouse events and the like) and their execution order may be defined 700. This additional configuration information is provided to the event sense and distribution procedure 322 to enable it to ensure proper execution order of the events for the various program applications. For example, in FIG. 6, the execution order should ensure that Button 1 precedes Button 2 because calculation should precede generation of graphs and reports. Execution order is also discussed with respect to FIG. 8.

Another configuration processing operation is the configuration 702 of the selected program applications into one or more context groups. A context group is simply a group of program applications which includes some or all of the running program applications. The context group is controlled by the concurrency control window 320 in a multicasting fashion. For example, with regard to FIG. 6, it was previously assumed that the spreadsheet program, the graphic program and the distribution program were in a single context group so that if Button 2 is pressed it would be multicast to both the graphic program and the distribution program simultaneously. Even though the spreadsheet program is in the context group, no operation is performed because no input child window of the spreadsheet program is coupled to Button 2. The configuration 702 of the program applications into context groups acts to set up the multicasting environment. Hence, for the user's convenience, it is useful to allow multiple context groups so that the user can simply select a context group to alter the multicast at run time. An application may be in one or more context groups. However, at any given time, one context group is selected, that group is denoted the working context group.

As discussed above and shown in FIG. 6, Button 1 of the concurrency control window 320 is coupled with the Calculate Button of the application window 602 for the spreadsheet program, and Button 2 of the concurrency control window 320 is coupled with both the Graph Button of the application window 604 for the graphic program and the Report and Send Buttons of the application window 606 for the distribution program. Hence, when Button 2 of the concurrency control window is selected, the invention operates to multicast the button press operation to the Graph Button of the graphic program and the Report and Send Buttons of the distribution program. As a result, the graphic program and the distribution program can perform operations concurrently. This is true regardless of whether the graphics program and the distribution program reside on the same computer (multitasking) or on different computers (distributed). In addition, the concurrency control window 320 may include a global command line 608 which can be itself coupled with one or more of the command lines 610, 612 and 614 of the application windows 602, 604 and 606.

To facilitate use of the concurrency control window 320, it may further include a Context Add Button 616, a Context Delete Button 618, a Context Associate Button 620, and a Child Window Connect Button 622. The Context Add Button 616 is used to add application programs into a context group. For example, as shown in FIG. 6, the working context group could include all three of the application programs 602, 604 and 606. To create such a context group, one could simply point-and-click on the Context Add Button 616 and then on each of the windows 602, 604 or 606 of the application programs. The working context group would include all three of the application programs 602, 604 and 606. However, the working context group need not include all three application programs, but could include any combination of programs (e.g., any single program or pair of programs). The Context Delete Button 618 is used to delete an application program from a context group.

In addition to the context grouping, the generic input windows of the concurrency control window 320 can be dynamically coupled with certain input windows of the application programs. The Child Window Connect Button 622 can be used to perform the connections. In the exemplary screen display 600 shown in FIG. 6, Button 1 of the concurrency control window 320 is coupled with the Calculate Button of the application window 602 for the spreadsheet application, Button 2 of the concurrency control window 320 is coupled with the Graph Button of the graphic program and the Report and Send Buttons of the distribution program, and the global command line 608 is coupled with the command lines 610, 612 and 614. As an example, the connections for Button 2 can be achieved manually by point-and-click on the Child Window Connect Button 622 and then on the Graph Button of application window 604 and on the Report and Send Buttons of the application window 606.

When a Button 2 event occurs, the event is multicast to both the Graph Button of the Graphic program and the Report and Send Buttons of the distribution program, provided both the graphic program and the distribution program are in the working context group. If, however, the graphic program 604 is first removed from the context group (by using the Context Delete Button 618 or by changing to another working context group) and then the Button 2 event occurs, then the event is multicast to only the Report and Send Buttons of the distribution program.

The Context Associate Button 620 may be provided for the user's convenience. Typically, once an application is invoked or started, one or more windows containing reference material for the program may be needed. If so, these reference windows 624 might be displayed on the screen display 600 (see FIG. 6). In such cases, the Context Associate Button 620 can be used to associate or link the reference windows 624 to the corresponding application programs (see block 510 in FIG. 5). Alternatively, the association could be automated using windows tree information. In any case, the benefit is that thereafter when the user clicks on an application program to bring it to the front (top) of the screen, its associated reference windows, if any, can also be brought to the front (top) so that the user can view all the relevant windows.

Figure 8:
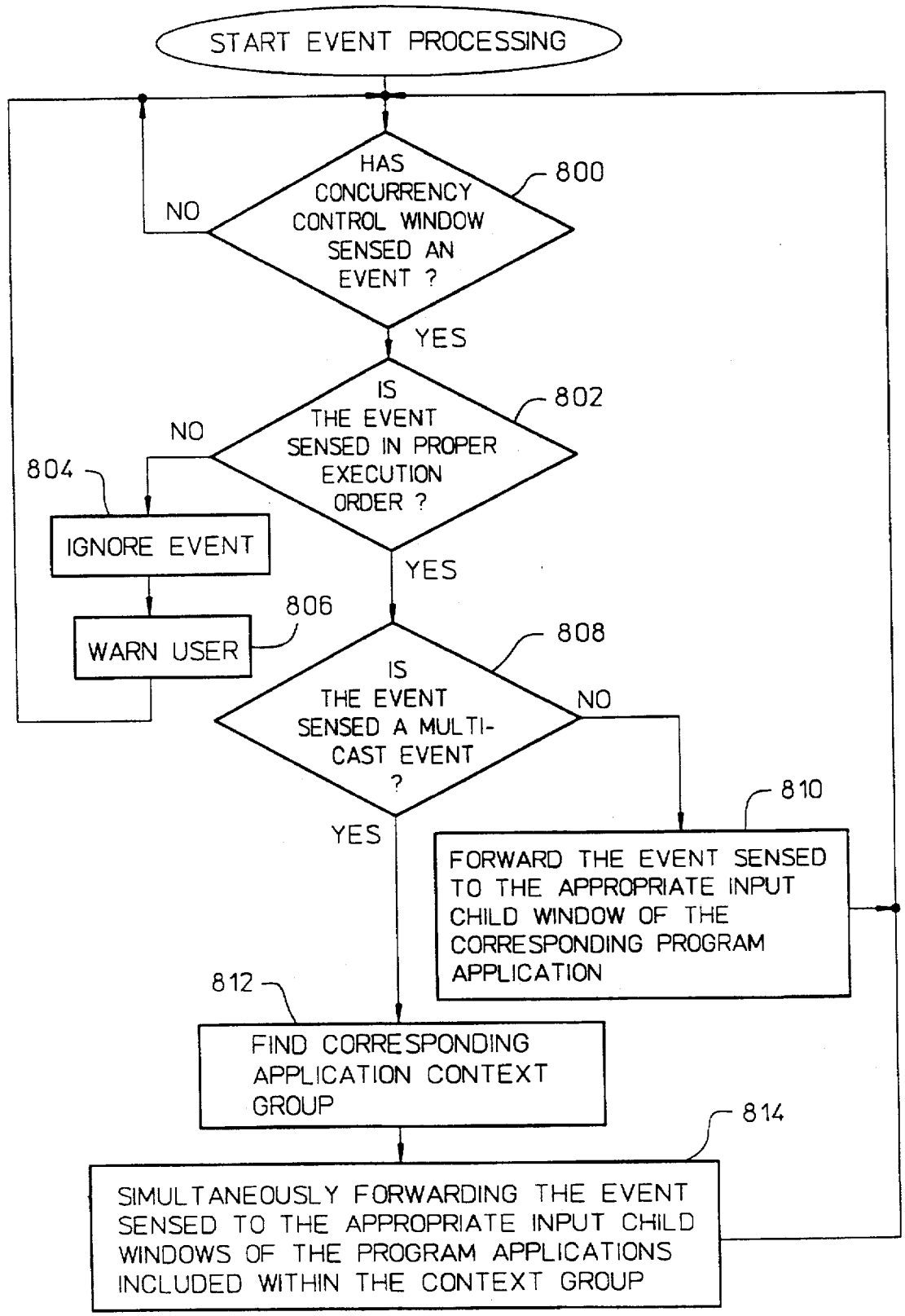
FIG. 8 is a flowchart of event sense processing procedures.

Next, event processing procedures performed by the event sense and distribution procedure 322 are described. FIG. 8 illustrates a flowchart of the event sense processing procedures. The processing begins by determining whether the concurrency control window 320 has sensed an event. A decision 800 is made based on this determination. If the concurrency control window 320 has not sensed an event, the event processing waits until one is received. Once the concurrency control window 320 has sensed an event, the event processing proceeds to make another decision 802. This decision 802 determines whether the event sensed is in the proper execution order based on the user input. If the event sensed is out of order, then the event is ignored 804, the user is warned 806, and processing returns to step 800. Alternatively, although not illustrated, the event sense and distribution procedure 322 could temporarily store the out-of-order event and then reorder the out-of-order event with a subsequently entered event, thereby correcting the execution order.

On the other hand, if the event sensed is in the proper execution order, a decision 808 is determined based on whether the event sensed is a multicast event. If the event sensed is not a multicast event, the event sensed is forwarded 810 to the appropriate input child window of the corresponding program application. In this case, the event sense and distribution procedure operates in a local mode. Thereafter, the processing returns to step 800 to await the next event. If, however, the event sensed is a multicast event, then the event sense and distribution procedure 322 operates in a global mode and the appropriate application context group must be found 812. Once the context group is found 812, the event sensed is simultaneously forwarded 814 to the appropriate input child windows of the program applications included within the context group. This completes the event processing procedures.

The event processing procedures can be further enhanced as desired. One enhancement is that the event sensed may be forwarded to input child windows of same or different action types. For example, in FIG. 6, the Graph Button and the Report and Send Buttons are all of different action types. Still a further enhancement of this method allows synchronization or ordering of the multicasted event within a child window of a given program application. For example, with respect to FIG. 6, the Report and Send Buttons (as well as the Graph Button) are both connected to Button 2; hence, when Button 2 is pressed, it is multicasted to the Report and Send Buttons. This enhancement causes the processing to insure that the Report Button event immediately precedes the Send Button event so that the buttons are sequenced within the program application. In such a case, the Report and Send Buttons would not themselves initiate events concurrently, though nearly so. Even so, a single press of Button 2 still causes the event to be multicasted and the events are initiated in all the windows of the multicast group more simultaneous than sequential button pressing.

As can be seen from the above example, the event multicasting system according to the invention can be configured to operate such that it can switch between local and global modes. In the local mode, the window event is forwarded to only a single GUI of a single application. In the global mode, the window event can be forwarded (multicast) to a plurality of GUIs. These multiple GUIs can correspond to only a single application or to multiple applications.

The invention can also be used on applications which allow the user to interact with the screen anywhere on it (full-screen applications). In this case, there may not be any text or button fields. Nevertheless, the window events (e.g., keyboard) can be multicast to multiple application programs. As an example, this would allow a user to edit a document while having other like documents simultaneously edited, which would be particularly useful when the other documents are located at remote computers or workstations.

In general, the event multicasting system uses a standard window system to sense the user window events. The system then multicasts the events to selected applications to perform some functions concurrently. The system can also be used to order or synchronize events. By multicasting the events, the system makes a nondistributed application function as a distributed application. Furthermore, the event multicasting system supports different systems, workstations, and different types of existing software in a heterogeneous network. Thus, the system is scalable, portable and reusable.

The GUI according to the invention adds an additional layer above (top down approach) the applications GUIs. In general, the invention enables GUIs to be structured in a hierarchical fashion with an arbitrary number of levels. This offers many advantages which are useful in GUI designs. For example, the invention would allow construction of multiple layers of GUIs. Each level would provide a subset of the functionality of the layer below. Hence, in a top down approach, the highest level would be the most simplified GUI, and each lower layer would be more complex. As an example, a user who is a novice would use the highest level (most simplified) GUI for a program, whereas a sophisticated user would probably prefer a more specific and powerful GUI available at a lower level. It also enables large, complex applications to be constructed in a modular fashion. The invention can also multicast to different layer application GUIs. For example, a control window can multicast events to other control windows as well as to application windows.

If all of the application programs selected are of the same program, the concurrency control window 320 may be made to be an exact replica of the window of the program application. Such a window would be comforting to a user who is familiar with the application window of the program.

In addition, the events input into the concurrency control window 320 can be simultaneously illustrated in the application windows 314, 316, 318, 602, 604, 606 which appear on the screen display of the host computer 300 along with the concurrency control window 320. For example, with regard to FIG. 6, if the user types "print" in the global command line 608 of the concurrency control window 320, the word "print" will also be shown as being typed in each of the application windows 602, 604 and 606 (assuming all three applications are within the context group). Alternatively, the application windows may appear to the user as simply icons. Yet another option is to provide buttons 626, 628 and 630 in the concurrency control window 320 which, when pressed, will bring up the appropriate application window 602, 604 or 606 (and their associated reference windows 624) so the user may view it (see FIG. 6).

The invention is useful for many situations in which a distributed application is desired. Consider a spreadsheet example. If a group of departments utilize a spreadsheet program to plot graphs and print a report each month, typically the spreadsheet setup is to be identical. The conventional approach requires that someone build the spreadsheet templates including formulas, set up the graphic formats, and build the reports. Once these tasks are performed, the spreadsheet templates must be somehow distributed to all the machines in each department. Workers in each department thereafter enter department specific data into their work space and run the graphs and reports. The main difficulty is in insuring that any changes to the spreadsheet graphic formats or reports are distributed to each department in a timely manner so that each department may update its versions locally.

The present invention simplifies the procedure dramatically. According to the invention, the person responsible for maintaining the spreadsheet would now simply bring up a control window. The control window would then be used to start the spreadsheet application residing on each remote computer and a flag set to indicate that the changes made to the spreadsheet are to be made (distributed) to all remote computers. Thereafter, the person would simply make the changes once to the spreadsheet templates, graphic formats and reports and automatically, at the same time, change all the copies on the remote computers. Furthermore, at the end of the month, after the individual department workers have entered their department specific data, a single person could bring up the spreadsheets on all the remote computers using a control window, configure the control window for global commands, and generate all the graphs and reports by entering commands in only the control window. The only requirement is that all the copies of the application be on computers which may be started by the host computer. No changes to the individual applications are required.

Another example of useful situation for the invention is a parallel debugger. The invention would allow debugging of a parallel application. Hence, the user could control the debugging process with a single window (e.g., concurrency control window) and multicast commands (e.g., step command) for concurrent execution. Yet another useful situation for the invention is in queries or updates for multiple databases. Still another useful situation is shadow file saves for multiple files. As an example, a user at the end of the day could press a global save button to save all programs which the user has invoked whether on the user's computer or some remote computer connected via network links.

The many features and advantages of the invention are apparent from the written description and thus it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. In a computer system running a plurality of mutually independent application programs each having an associated window on a display screen, each such program being unaffected by events that occur outside its associated window, an improvement that enables the computer system to multicast window events to the application programs, the improvement comprising:

a global control program running in the computer system, the global control program responsive to a command from a user of the computer system to designate a plurality of the application programs to receive incoming window events, and a global control window on the display screen, the global control program operative only when the global control window is active to receive an incoming window event in the global control window and to multicast the incoming window event to the windows associated with the designated application programs.

2. An improvement as in claim 1 wherein: the computer system comprises a host computer and a remote computer in communication with each other; at least one of the application programs resides in the remote computer; and the global control program resides in the host computer.

3. An improvement as in claim 1 wherein: the window associated with one of the designated application programs has an application child window; and the global control program is operative to multicast a window event received in the global control window to the application child window.

4. An improvement as in claim 3 wherein: the global control window includes a global child window for receiving window events; and the global control program associates the global child window with the application child window, whereby a window event received in the global child window is multicast to the application child window.

5. An improvement as in claim 3 wherein: the computer system comprises a host computer and a remote computer in communication with each other; the application program associated with the window having the application child window resides in the remote computer; and the global control program resides in the host computer.

6. An improvement as in claim 1 wherein designating a plurality of the application programs to receive incoming window events comprises associating the global control window with the application windows of each of said plurality of application programs.

7. An improvement as in claim 6 wherein: the global control window includes a global field for receiving window events; and the global control program associates the global field with corresponding fields in a plurality of the application windows, whereby a window event received in the global field is multicast to the corresponding fields in the application windows.

8. A method of multicasting window events to a plurality of application windows, each application window associated with one of a plurality_ of mutually independent application programs each of which application programs is unaffected by events occurring outside its associated application window, the method comprising:

(a) displaying a global control window;

(b) selecting a plurality of the application windows to receive multicast window events;

(c) receiving an incoming window event in the global control window; and (d) multicasting the incoming window event to the selected application windows.

9. A method as in claim 8 wherein step (b) comprises selecting a child window of one of the application windows and step (d) comprises multicasting the incoming window event to the selected child window.

10. A method as in claim 9 wherein step (a) comprises displaying a global child window of the global control window and step (c) comprises receiving the incoming window event in the global child window.

11. A method as in claim 8 wherein step (b) comprises associating the global control window with the application windows of each of said plurality of application windows.

12. A method of multicasting window events to a plurality of application windows, each application window associated with one of a plurality of mutually independent application programs each of which application programs is unaffected by events occurring outside its associated application window, the method comprising:

(a) displaying a global control window;

(b) selecting a plurality of the application windows to receive multicast window events;

(c) receiving a plurality of incoming window events in the global control window; and (d) multicasting the incoming window events to the selected application windows.

13. A method as in claim 12 and further comprising, prior to step (d), the step of determining whether the plurality of incoming window events are in proper execution order.

14. A method as in claim 13 and further comprising, prior to step (d), the step of discarding any incoming window event that is not in proper execution order.

15. A method as in claim 13 and further comprising, prior to step (d), the step of reordering any incoming window events that are not in proper execution order.

16. A method as in claim 12 wherein step (b) comprises selecting a child window of each of a plurality of the application windows and step (d) comprises multicasting the incoming window event to the selected child windows.

17. A method as in claim 16 wherein step (a) comprises displaying a global child window of the global control window and step (e) comprises receiving the incoming window event in the global child window.

18. A method as in claim 17 and further comprising, prior to step (d), the step of determining whether the plurality of incoming window events are in proper execution order.

19. A method as in claim 18 and further comprising, prior to step (d), the step of discarding any incoming window event that is not in proper execution order.

20. A method as in claim 18 and further comprising, prior to step (d), the step of reordering any incoming window events that are not in proper execution order.

21. A method of multicasting window events to a plurality of application windows, each application window associated with one of a plurality of mutually independent application programs each of which application programs is unaffected by events occurring outside its associated application window, the method comprising:
    (a) displaying a global control window;
    (b) displaying in the global control window a global field for receiving window events;
    (c) associating a field in each of a plurality of application windows with the global field;
    (d) receiving an incoming window event in the global field; and
    (e) multicasting the incoming window event to the associated field in each of the plurality of application windows.

* * * * *